(12) United States Patent
Vershum

(10) Patent No.: US 7,452,586 B2
(45) Date of Patent: Nov. 18, 2008

(54) FLOOR COVERING

(75) Inventor: Raymond G. Vershum, Youngstown, OH (US)

(73) Assignee: Polyair Corporation, Toronto, Ontario (CA)

( * ) Notice: Subject to any disclaimer, the term of this patent is extended or adjusted under 35 U.S.C. 154(b) by 324 days.

(21) Appl. No.: 10/909,937

(22) Filed: Aug. 2, 2004

(65) Prior Publication Data

US 2006/0024475 A1   Feb. 2, 2006

(51) Int. Cl.
*B32B 3/24* (2006.01)

(52) U.S. Cl. .............. 428/137; 428/156; 428/134; 428/136; 428/318.8

(58) Field of Classification Search .......... 428/137, 428/156, 134, 136, 318.8
See application file for complete search history.

(56) References Cited

U.S. PATENT DOCUMENTS

| | | | |
|---|---|---|---|
| 3,607,603 A | 9/1971 | Coverdale | |
| 3,655,501 A * | 4/1972 | Tesch | 428/136 |
| 3,666,611 A | 5/1972 | Joa | |
| 3,676,537 A * | 7/1972 | Winstead | 264/48 |
| 4,075,377 A | 2/1978 | Aitchison et al. | |
| 4,187,337 A | 2/1980 | Romageon | |
| 4,199,639 A * | 4/1980 | Ronc | 428/138 |
| 4,201,609 A | 5/1980 | Olsen | |
| 4,211,590 A * | 7/1980 | Steward et al. | 156/79 |
| 4,557,774 A * | 12/1985 | Hoopengardner | 156/71 |
| 4,657,811 A | 4/1987 | Boyd et al. | |
| 4,910,936 A | 3/1990 | Abendroth et al. | |
| 5,103,614 A | 4/1992 | Kawaguchi et al. | |
| 5,173,346 A | 12/1992 | Middleton | |
| 5,204,155 A | 4/1993 | Bell et al. | |
| 5,409,564 A | 4/1995 | Aaldijk | |
| 5,443,885 A | 8/1995 | Wilson | |
| 5,501,895 A | 3/1996 | Finley et al. | |
| 5,578,363 A | 11/1996 | Finley et al. | |
| 5,612,113 A | 3/1997 | Irwin, Sr. | |
| 5,617,687 A | 4/1997 | Bussey, Jr. et al. | |
| 5,658,637 A | 8/1997 | Volz | |
| 5,759,670 A | 6/1998 | Bussey, Jr. et al. | |
| 5,766,721 A | 6/1998 | Bussey, Jr. et al. | |
| 5,834,093 A * | 11/1998 | Challis et al. | 428/136 |
| 5,952,076 A * | 9/1999 | Foster | 428/77 |
| 5,968,630 A | 10/1999 | Foster | |
| 6,013,342 A * | 1/2000 | Neto | 428/40.1 |

(Continued)

FOREIGN PATENT DOCUMENTS

WO   WO 90/14945   12/1990

(Continued)

*Primary Examiner*—William P Watkins, III
(74) *Attorney, Agent, or Firm*—Banner & Witcoff, Ltd.

(57) ABSTRACT

A temporary floor covering 10 that allows air and moisture to pass through the covering 10 is disclosed. The floor covering 10 has a first layer 12, a second layer 14 connected to the first layer 12, and a plurality of perforations 18 in the covering 10. The first layer 12 is typically made of a low-density polyethylene foam, and the second layer 14 is typically made of a polyethylene film. The perforations 18 extend through the first and second layers 12, 14 to allow air and moisture to pass through both the first layer 12 and the second layer 14. Additionally, an outer surface of one of the first layer 12 or the second layer 14 may have an increased coefficient of friction.

17 Claims, 3 Drawing Sheets

U.S. PATENT DOCUMENTS

| | | |
|---|---|---|
| 6,090,462 A | 7/2000 | Kanter |
| 6,128,879 A | 10/2000 | Bussey, Jr. et al. |
| 6,139,945 A | 10/2000 | Krejchi et al. |
| 6,159,576 A | 12/2000 | Rockwell, Jr. |
| 6,167,668 B1 | 1/2001 | Fine et al. |
| 6,187,424 B1 | 2/2001 | Kjellqvist et al. |
| 6,189,279 B1 | 2/2001 | Fiechtl |
| 6,253,526 B1 | 7/2001 | Murphy et al. |
| 6,271,276 B1 | 8/2001 | Gribble et al. |
| 6,296,919 B1 | 10/2001 | Rockwell et al. |
| 6,408,584 B1 | 6/2002 | Rodriguez |
| 6,478,995 B1 | 11/2002 | Rockwell, Jr. et al. |
| 6,521,289 B2 | 2/2003 | Wyman |
| 6,572,952 B1 | 6/2003 | Kanter |
| 6,576,577 B1 | 6/2003 | Garner |
| 6,599,600 B1 | 7/2003 | Wyman |
| 6,607,803 B2 | 8/2003 | Foster |
| 6,629,340 B1 | 10/2003 | Dale et al. |
| RE38,422 E | 2/2004 | Rockwell, Jr. et al. |
| 6,688,065 B2 | 2/2004 | Chambers |
| 6,878,433 B2 * | 4/2005 | Curro et al. .................. 428/198 |

FOREIGN PATENT DOCUMENTS

| | | |
|---|---|---|
| WO | WO 02/052114 A1 | 7/2002 |

* cited by examiner

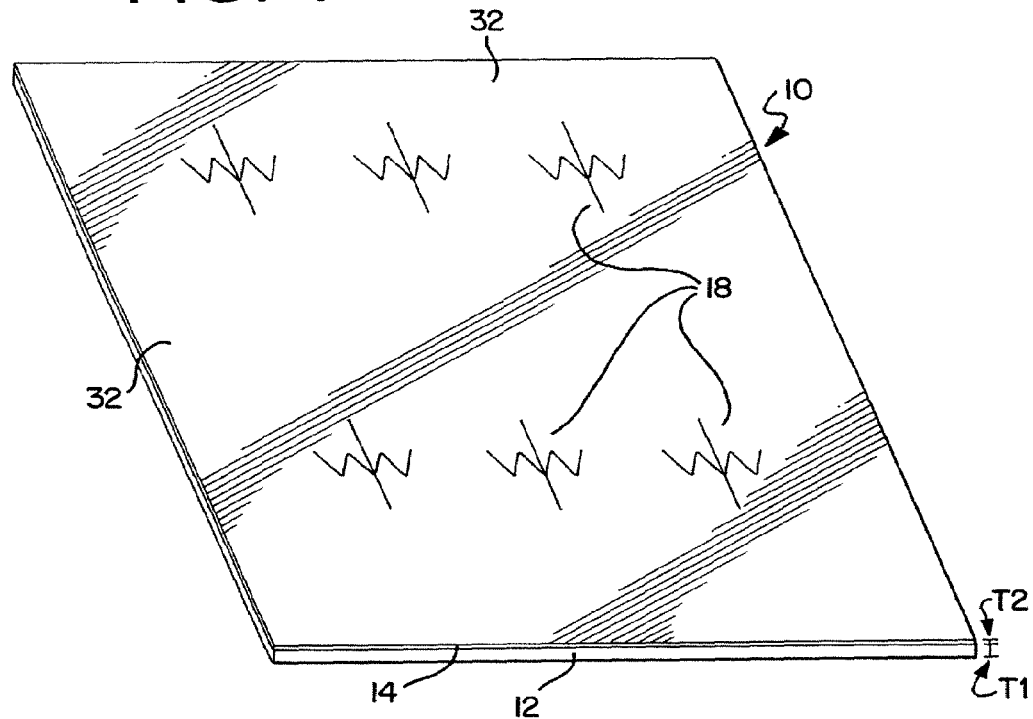
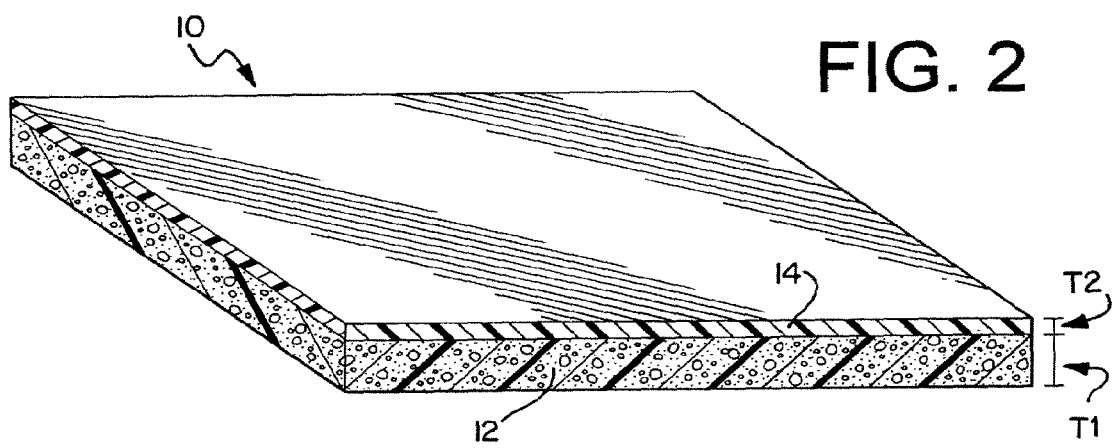

FLOOR COVERING

CROSS-REFERENCE TO RELATED APPLICATIONS

Not Applicable.

FEDERALLY SPONSORED RESEARCH OR DEVELOPMENT

Not Applicable.

TECHNICAL FIELD

The invention relates generally to a sheet material that may be utilized as a floor covering, and more particularly to a protective temporary floor covering having a means for allowing air and moisture to pass through the layers of the floor covering.

BACKGROUND OF THE INVENTION

Floor covering systems are well known in the art. Floor covering systems are generally used to protect the floor substrate during periods of construction, repair, remodeling, moving, etc. While floor covering systems according to the prior art provide a number of advantageous features, they nevertheless have certain limitations. The present invention seeks to overcome certain of these limitations and other drawbacks of the prior art, and to provide new features not heretofore available.

SUMMARY OF THE INVENTION

The present invention generally provides a sheet material in the form of a flooring covering. One embodiment of the flooring covering has a first layer, a second layer, and a plurality of perforations. The first layer has a first surface and a second surface, and the first layer is made of a polymeric material. The second layer has a first surface and a second surface, and the second layer is connected to the first layer. The second layer is also made of a polymeric material. A plurality of the perforations extend through at least a portion of the first layer, from the first surface of the first layer to the second surface of the first layer, and a portion of the second layer, from the first surface of the second layer to the second surface of the second layer, to allow air and moisture to pass through both the first layer and the second layer.

According to another embodiment, the first layer is made of a polyethylene foam material, and the second layer is made of a polyethylene film layer.

According to another embodiment, the sheet material has a non-skid outer surface.

According to yet another embodiment, the first layer has a plurality of ribs extending from a surface thereof.

Other features and advantages of the invention will be apparent from the following examples in the specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of one embodiment of a floor covering having a first layer, a second layer having an increased coefficient of friction on the outer surface, and a plurality of perforations passing through a portion of the first layer and the second layer;

FIG. 2 is a magnified perspective view of another embodiment of a floor covering having a foam layer and a film layer;

DETAILED DESCRIPTION OF THE INVENTION

While this invention is susceptible of embodiment in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

Figure 5:
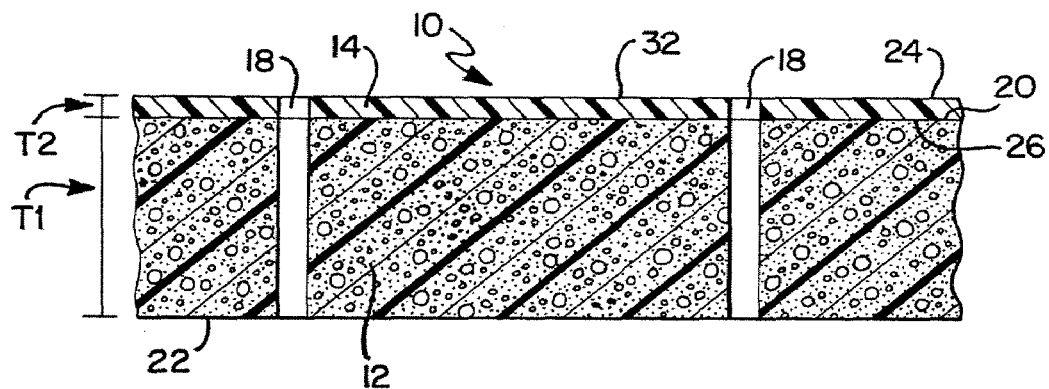
FIG. 5 is a partial cross-sectional view of the sheet of FIG. 1, showing the perforations passing through a portion of the first layer and the second layer.

Referring now in detail to the FIGS. and initially to FIGS. 1 and 5, there is shown a sheet material 10 having a first layer 12, a second layer 14, and a plurality of perforations 18 extending through the first layer 12 and the second layer 14. One function of the perforations is to allow air and moisture to pass through at least a portion of both the first layer 12 and the second layer 14. In a preferred embodiment, the sheet material is a floor covering 10. In a most preferred embodiment, the floor covering 10 is a temporary floor covering to protect floors during potentially damaging activities such as construction, repair, remodeling, or moving. When used as a floor covering, the sheet protects against dents, scratches, cracks or other mars caused by heavy or sharp objects sliding or falling on the floor. The floor covering 10 is generally made by having the multiple layers 12,14 of the sheet laminated together.

As shown in FIG. 5, the first layer 12 has a first surface 20 and a second surface 22, and the second layer 14 has a first surface 24 and a second surface 26. In this embodiment, the first surface 20 of the first layer 12 contacts the second surface 26 of the second layer 14. The perforations 18 generally extend through at least a portion of the first layer 12, from the first surface 20 of the first layer 12 to the second surface 22 of the first layer 12, and a portion of the second layer 14, from the second surface 26 of the second layer 14 to the first surface 24 of the second layer 14. In one embodiment, the thickness T1 of the second layer 14 is substantially less than the thickness T2 of the first layer 12 in the sheet 10 as shown in FIGS. 1 and 5.

The first layer 12 of the floor covering 10 is made of a material that has cushioning properties. In a preferred embodiment, first layer 12 of the floor covering 10 is made of a polymer foam material. In one embodiment, the first layer 12 is made of a low density polyethylene foam layer, as illustrated in FIG. 2. It is understood by those of ordinary skill in the art that both low density and high density polymers are acceptable. Polyethylene is the preferred material because it is recyclable and has good cushioning properties. It is understood by those of ordinary skill in the art that other polymeric material or polymeric resins may be utilized for the first layer 12. For example, the first layer 12 may be made of polypropylene, polyvinyl chloride, polystyrene, nylon, polyethylene terpthalate (PET), kevlar, or any other suitable polymeric material, including co-polymers of the above. Further, it is understood that the first layer 12 can also be formed of non-polymeric materials.

The polyethylene foam material can be formed by means of a conventional polyethylene foam sheet extrusion process, or by any other suitable foam sheet-forming process. In a typical polyethylene foam sheet extrusion process, pellets of the thermoplastic polyethylene resin are blended with a solid phase nucleating agent and, then, are melted in a heated extruder where the plastic and nucleating agent combination is held at both a high temperature and a high pressure. The blowing agent(s), which generally liquefies within the extruder, and which will vaporize at die melt temperatures and atmospheric pressure, is added to the pressurized melted material. Within the molten extrudate, the blowing agent(s) tends to act as a plasticizer to reduce the viscosity of the extrudate, and, thus, it lowers the level of temperature necessary to maintain the hot melt condition of the mixture of thermoplastic polyethylene material and nucleating agent. The blowing agent(s) is mixed with the melted polyethylenic plastic and nucleating agent, and the combination is, subsequently, cooled to an extrusion temperature suitable for foaming. To prevent the collapse of the resulting foam structure over time, a permeation modifier agent is often also added to the melt composition in the extruder (or as otherwise conventional or suitable). The cooled combination is pushed through a die by the pressure gradient, and, when released to atmospheric pressure, the liquefied physical blowing agent(s) vaporizes and expands to form bubbles of gas at the nucleating sites established by the uniformly dispersed nucleating agent particles. The process can be usually operated on a continuous basis using a conventional extruder system.

Figure 7:
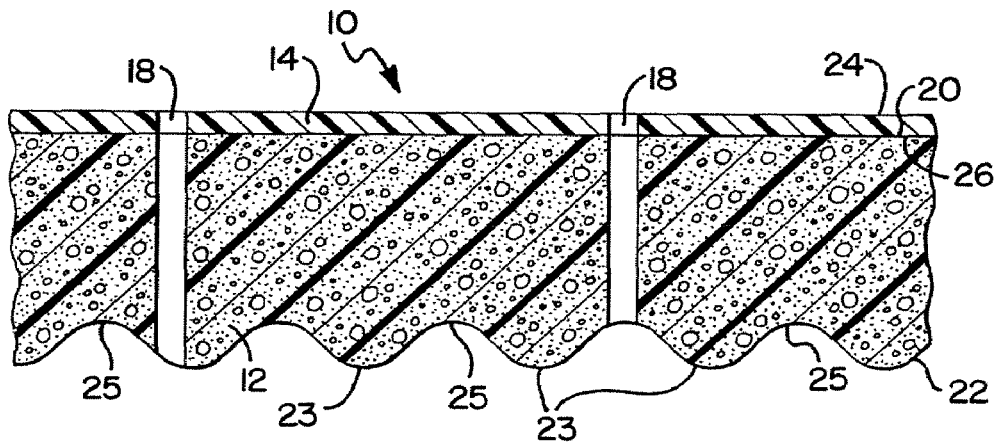

In an alternate embodiment shown in FIG. 7, the first layer 12 of the floor covering 12 has a plurality of ribs, ridges or undulations 23 at the second surface 22 of the first layer 12. The ribs 23 provide additional cushioning for the floor covering 10. The ribs 23 also allow air and moisture found under the floor covering 10 to flow in the valleys 25 adjacent the ribs 23, such that the air and moisture can be expelled at the perforations 18. In one embodiment, the foam layer 12 having the ribs 23 is approximately 0.1875" thick, and the film layer 14 is approximately 0.0001" to 0.00015" thick.

Additionally, in a preferred embodiment the second layer 14 of the floor covering 10 is made of a material that has protective properties. In one embodiment, the second layer 14 of the floor covering is made of a polymer film layer. Both high density and low density polymers function effectively when used in the sheet material 10. Most preferably, the second layer 14 is a high density polyethylene film layer, as illustrated in FIG. 2. Alternately, the second layer 14 is made of polypropylene, polyvinyl chloride, polystyrene, nylon, polyethylene terephthalate (PET), kevlar, or any other suitable polymeric material, including co-polymers of the above. It is understood, however, that the second layer 14 can also be formed of non-polymeric materials.

In another embodiment, the second layer 14 of the floor covering 10 is made of a co-extruded film comprised of varying combinations of linear low-density polyethylene, high-density polyethylene, low-density polyethylene, monolayer high-density polyethylene and monolayer low-density polyethylene. Such co-extruded films exhibit different properties at different layers thereof. Specifically, in one embodiment, the film of the second layer 14 may have high-density rich properties at its topside, the first surface 24 of the second layer 14, and it may have low-density rich properties at its underside, the second surface 26 of the second layer 14. Having low-density rich properties at the second surface 26 of the second layer 14 provides assistance when laminating the second surface 26 of the second layer 14 to the first surface 20 of the first layer 12.

Figure 4:
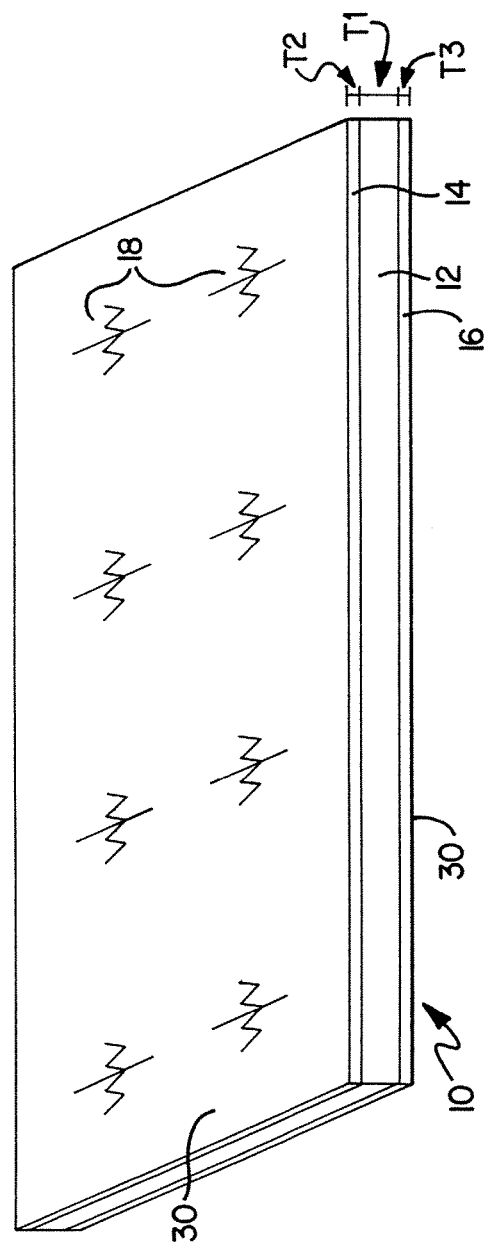
FIG. 4 is a perspective view of another embodiment of a floor covering having a first layer, a second layer having a tacky outer surface, a third layer having a tacky outer surface, and a plurality of perforations passing through a portion of the first layer, the second layer, and the third layer.
Figure 6:
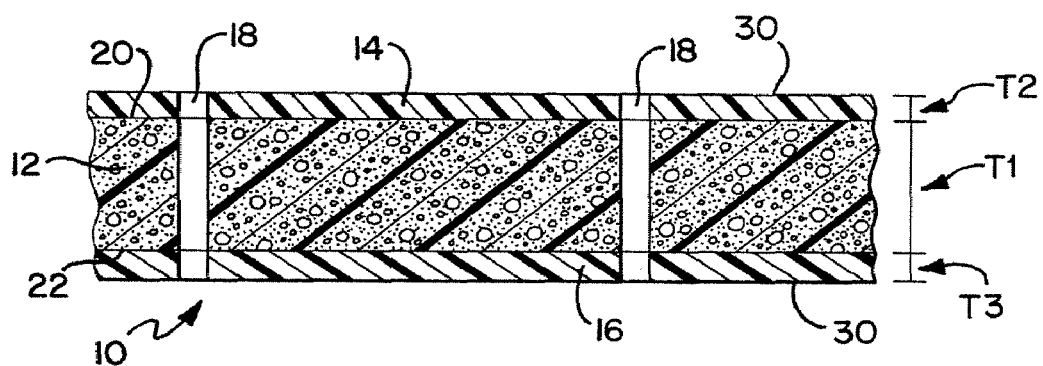
FIG. 6 is a partial cross-sectional view of the sheet of FIG. 4, showing the perforations passing through a portion of the first layer, the second layer, and the third layer; and, FIG. 7 is a side elevation view of another embodiment of a floor covering having ribs depending from an outer surface.

In yet another embodiment as shown in FIGS. 4 and 6, the floor covering 10 further includes a third layer 16 in contact with the first layer 12. In this embodiment, the second layer 14 contacts a first surface 20 of the first layer 12, and the third layer 16 contacts a second, opposing surface 22 of the first layer 12. As shown in FIG. 6, a plurality of the perforations 18 extend through at least a portion of the first layer 12, the second layer 14, and the third layer 16, allowing air and moisture to pass through the floor covering 10. Preferably, in this embodiment, the first layer 12 comprises a low density polymer foam, the second layer 14 comprises a high-density polymer film, and the third layer 16 comprises a high-density polymer film. The thickness T1 of the first layer 12 is substantially greater than the thickness T2 of the second layer 14 and the thickness T3 of the third layer 16 as shown in FIGS. 4 and 6. It is understood that the floor covering 10 may contain any number of layers, limited only by manufacturing capabilities and practicality for a specific application.

The perforations 18 generally extend completely through a portion of the entire thickness of the floor covering 10, i.e., through the first layer 12, the second layer 14, and, if present, the third layer 16. This configuration prevents air and moisture from being trapped beneath the floor covering 10, because the air and moisture can escape through the perforations 18. In a preferred embodiment, the perforations 18 are arranged in a regular pattern in the floor covering 10. The perforations 18 are generally created by a perforation or piercing tool, which results in the jagged, cross-shaped perforations 18 shown in FIGS. 1 and 4. Thus, it is understood that the illustrations shown in FIGS. 3 and 5-7 disclose only a partial cross-section through the perforations 18. In one manufacturing process, the perforations 18 are created by passing the floor covering 10 through a pair of rollers. One of the rollers has a series of protruding elements in the shape and configuration of the desired perforations. The other roller is utilized as an anvil against which the protruding elements of the first roller press. The force of the perforation elements against the anvil cuts the perforations 18 in the floor covering 10. The cross-sectional shape of the perforations 18 of the preferred embodiment allows each perforation to cover a large area, while preventing dust or dirt from falling to the floor below the floor covering 10. It is understood that the perforations 18 may alternately be created by other suitable means, and can be of alternate shapes to attain the desired result In another embodiment, the floor covering 10 has one or more tacky outer surfaces 30. Preferably, the tackiness of the tacky surface is not sufficiently high to strongly bind to other surfaces it contacts, and instead acts as a non-skid surface. In doing such, the tacky surface provides an increased coefficient of friction of the surface, thereby reducing or eliminating slippage or skid between the floor covering 10 and another surface or object.

Figure 3:
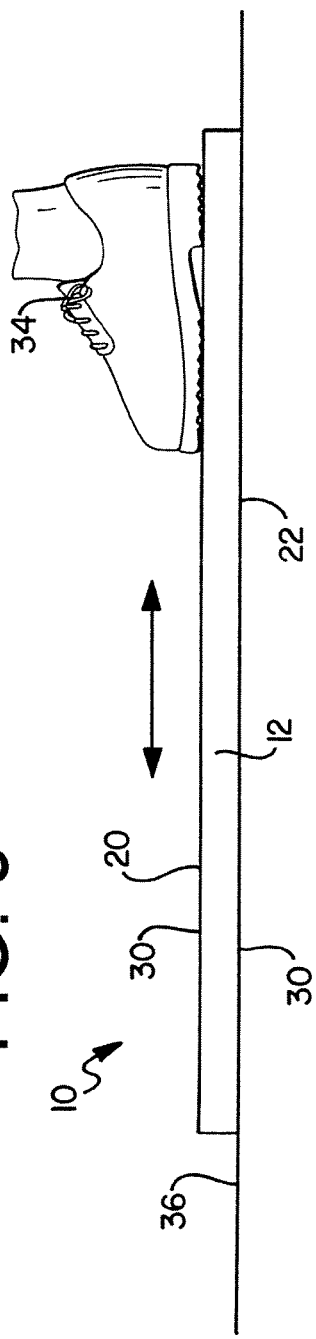
FIG. 3 is a side elevation view of another embodiment of a floor covering having a foam layer with a first tacky surface and a second tacky surface.

The floor covering 10 shown in FIG. 3 comprises a polymer foam layer 12 having two tacky outer surfaces 30 on opposing surfaces of the covering 10. As explained above, the tacky surfaces 30 are surfaced having an increased coefficient of friction of the top and bottom surfaces 20,22 of the covering 10, thereby reducing or eliminating slipping when contacting the covering. Thus, by providing the covering 10 with a tacky surface 30 contacting the floor 36, the covering 10 will not easily slip on the floor 36. Also, because the covering 10 has a tacky surface 30 facing upwards, persons 34 walking on the covering 10 will be less likely to slip. It is understood that the covering 10 may have only one tacky surface 30, and such a covering 10 can be placed with the tacky surface 30 facing upward or downward, as desired.

In one embodiment, the tacky surface 30 is a surface of the second layer 14. The second layer 14 is preferably a film layer having a tacky surface 30. However, the second layer 14 can be a non-film layer with a tacky surface 30, or a layer of tacky material, such as a non-skid surface coat polymer. Additionally, the covering 10 can have a tacky surface 30 as a surface of either the first layer 12 and/or the third layer 16. In the covering 10 shown in FIGS. 4 and 6, both the second layer 14 and the third layer 16 have a tacky outer surface 30 with an increased coefficient of friction. It is understood that the sheet 10 can have any number of layers, and any surface of the sheet 10 can be tacky.

In another embodiment, at least one outer surface 32 of the covering 10 has an increased coefficient of friction. The covering 10 shown in FIG. 1 has a first layer 12 and a second layer 14 having an increased coefficient of friction on its outer surface 32. However, in other embodiments, either layer or both layers 12,14 have an outer surface 32 with an increased coefficient of friction. Further, a third layer 16 can be included, having an outer surface 32 with an increased coefficient of friction. The increased coefficient of friction is preferably created by the presence of a tacky outer surface 30, as described above. However, it is understood that other means may be used to increase the coefficient of friction of the outer surface 32 of the covering 10. Examples of other ways to increase the coefficient of friction include the addition of ridges or bumps, or other geometric and chemical additions. It is further understood that a tape member could also be included on one or more of the peripheral edges of the floor covering 10.

The first layer 12 and second layer 14 of the covering 10 are generally connected together securely by any suitable means. Preferably, the first and second layers 12, 14 are laminated together. Such a lamination process typically involves the application of heat and pressure to bond the layers 12,14 to one another. The first and second layers 12, 14 can also be connected together by mechanical connections, such as with adhesives or other mechanical processes, or by any other suitable means. Similarly, if a third layer 16 is present, it is generally connected securely to the first layer 12 through one of the above-identified processes. In a preferred embodiment, the first and second layers 12, 14 of polyethylene are laminated together utilizing heat and pressure. Typically, the temperatures utilized to perform the lamination process range from 180-300 E F., and the pressure utilized to perform the lamination process ranges from 30 to 80 p.s.i. The lamination process creates a laminated sheet material 10. The lamination process may result in the formation of integral bonds between the laminate layers.

The sheet material disclosed herein has many beneficial uses. Most advantageously, the preferred embodiments are used as an insulating substrate, particularly as a temporary floor covering to protect floors during potentially damaging activities such as construction, repair, remodeling, or moving. When used as a floor covering, the sheet protects against dents, scratches, cracks or other mars caused by heavy or sharp objects sliding or falling on the floor. The foam layer provides excellent cushioning and insulating properties, and the film layer provides increased tensile strength and makes the sheet extremely resistant to tearing and other damage. The perforations prevent moisture from being trapped under the sheet, thereby protecting the floor from potential damage. Additionally, the tackiness or skid-resistance provides slip resistance to the sheet. It is understood that the sheet is useful in protecting other surfaces or objects, as well as in a variety of other applications understood by those skilled in the art Several alternative embodiments and examples have been described and illustrated herein. A person of ordinary skilled in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," and "third" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A floor covering comprising:
   a first layer having a first surface and a second surface, the first layer being made of a polymeric foam material comprising a low-density polyethylene foam;
   a second layer having a first surface and a second surface, wherein the second layer comprises a film having low-density rich properties at the second surface of the second layer, and high-density rich properties at the first surface of the second layer, the second layer being connected to the first layer; and,
   a plurality of perforations extending through at least a portion of the first layer, from the first surface of the first layer to the second surface of the first layer, and a portion of the second layer, from the first surface of the second layer to the second surface of the second layer, to allow air and moisture to pass through both the first layer and the second layer,
   wherein each of the perforations comprises a narrow, elongated slit in the floor covering having sufficient engagement between opposed edges of the perforation to prevent particulates from passing through the floor covering.

2. The floor covering of claim 1, wherein the second layer comprises a polymer film.

3. The floor covering of claim 1, wherein the first layer and the second layer are comprised of polyethylene.

4. The floor covering of claim 1, wherein the second layer comprises a high-density polyethylene film.

5. The floor covering of claim 1, further comprising a third layer in contact with the first layer, wherein the second layer contacts the first surface of the first layer, and wherein the third layer contacts the second surface of the first layer.

6. The floor covering of claim 5, wherein a plurality of the perforations extends through the first layer, the second layer, and the third layer.

7. The floor covering of claim 5, wherein the first layer comprises a low density polymer foam, wherein the second layer comprises a high density polymer film, and wherein the third layer comprises a high density polymer film.

8. The floor covering of claim 1, wherein the second surface of the first layer has a plurality of ribs.

9. The floor covering of claim 1, wherein the sheet material has a non-skid outer surface.

10. An insulating flooring substrate comprising:
a first polymer foam layer; and,
a second polymer film layer in contact with the first polymer foam layer, wherein the second layer has a first tacky surface, the first tacky surface having an increased coefficient of friction, the second layer having high density rich properties at the first surface thereof, and low density rich properties at a second, opposed surface thereof, the second surface contacting the first layer,
wherein the substrate has a second tacky surface at an opposing surface of the substrate to the first tacky surface, the second tacky surface increasing the coefficient of friction of the opposing surface of the substrate, and wherein the substrate has a plurality of perforations through the substrate, the perforations extending from an outer surface of the substrate to an opposing outer surface of the substrate, the perforations allowing air and moisture to pass through the substrate.

11. A temporary floor covering comprising:
a first layer made of a low density polyethylene foam;
a second layer made of a polyethylene film, the second layer comprising a co-extruded film having low density rich properties at an inner surface thereof, and high density rich properties at an outer surface thereof, the inner surface contacting the first layer; and,
a plurality of perforations in the covering, the perforations extending through the first and second layers to allow air and moisture to pass through both the first layer and the second layer.

12. The floor covering of claim 11, wherein the second layer is made of a high density polyethylene.

13. The floor covering of claim 11, wherein the first surface of the second layer has a substantially skid-resistant outer surface.

14. The floor covering of claim 11, wherein the second layer has a thickness, and wherein the thickness of the second layer is less than the thickness of the first layer.

15. The floor covering of claim 11, wherein the first layer has a plurality of ribs extending therefrom.

16. A temporary floor covering comprising:
a first layer made of a polyethylene foam;
a second layer made of a polyethylene film having low density rich properties at an inner surface thereof and high density rich properties at an outer surface thereof, the first layer being joined to the second layer at the inner surface of the second layer; and,
a plurality of perforations in the covering, the perforations extending through the first and second layers to allow air and moisture to pass through the first layer and the second layer.

17. The temporary floor covering of claim 16, wherein the perforations have a generally jagged cross-sectional shape.

* * * * *